United States Patent [19]

St. Clair et al.

[11] Patent Number: 4,713,439
[45] Date of Patent: Dec. 15, 1987

[54] POLY(CARBONATE-IMIDE) POLYMER

[75] Inventors: Terry L. St. Clair, Poquoson, Va.; Shubha Maudgal, Bombay, India; J. Richard Pratt, Poquoson, Va.

[73] Assignee: The United States of America as represented by the Administrator of the National Aeronautics and Space Administration, Washington, D.C.

[21] Appl. No.: 834,978

[22] Filed: Feb. 27, 1986

[51] Int. Cl.⁴ ............................................. C08G 69/26
[52] U.S. Cl. .................................... 528/353; 528/188; 528/226; 564/416; 564/430; 564/434
[58] Field of Search ...................... 528/353, 188, 226; 564/416, 430, 434

[56] References Cited

U.S. PATENT DOCUMENTS 3,705,870 12/1972 Darmory et al. .................. 528/353
4,063,984 12/1977 Critchley ............................ 528/353

Primary Examiner—Morton Foelak
Assistant Examiner—M. L. Moore
Attorney, Agent, or Firm—George F. Helfrich; John R. Manning

[57] ABSTRACT

A novel series of polymers and copolymers based on a polyimide backbone with the incorporation of carbonate moieties along the backbone. The process for preparing these polymers and copolymers is also disclosed as is a novel series of dinitrodiphenyl carbonates and diaminodiphenyl carbonates. The novel polymers and copolymers exhibit high temperature capability and because of the carbonate unit, many exhibit a high degree of order and/or crystallinity.

13 Claims, 1 Drawing Figure

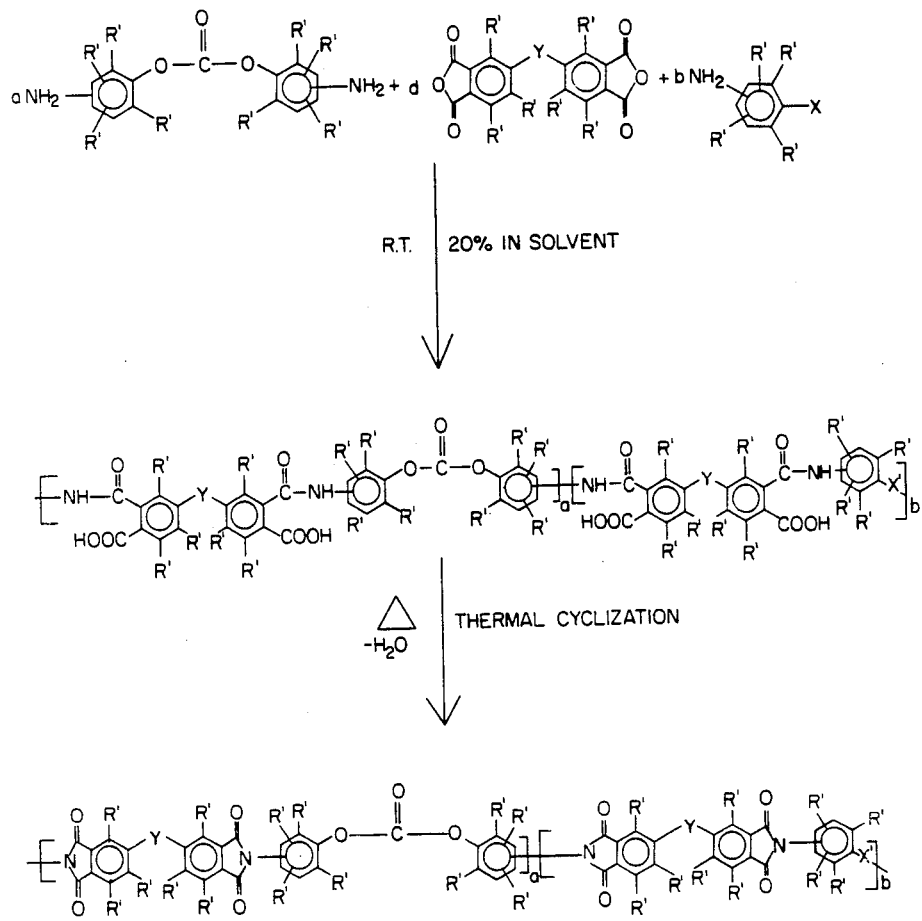

POLY(CARBONATE-IMIDE) POLYMER

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

BACKGROUND OF THE INVENTION

Commercial polymers based on the inclusion of carbonate units are well known (Lexan-General Electric and Makrolon-Bayer). These materials are thermoplastic (130° C. processing temperature) and exhibit a high degree of impact resistance when they are maintained in an amorphous state. The polymers do lose their toughness as they crystallize. The polycarbonates have a heat distortion temperature in the range of 130°-140° and can withstand continuous use at temperatures up to 120° C. These systems have always exhibited crazing and loss of properties when exposed to many organic solvents. Acetone is particularly deleterious to polycarbonates. Attempts to develop a more temperature and solvent-resistant polymers have led to the development of a series of polymers which contain both carbonate and imide units. This polymer class was synthesized because polyimides are known to afford excellent solvent resistance and to perform at elevated temperatures (W. M. Edwards, U.S. Pat. No. 3,179,634). Also the incorporation of thermoplastic, solvent-sensitive sulfone units into a polyimide backbone has resulted in a thermoplastic, solvent-resistant polymer (T. L. St. Clair and D. A. Yamaki, U.S. Pat. No. 4,398,021). However, neither of these polymers has the requisite properties desired for the present applications. Thus, there is a definite need in the art for an aromatic resin that can be cured between 180°-300° C. which exhibits improved solvent and thermal resistance.

Accordingly, an object of the present invention is to develop a series of poly(carbonate-imides) which can be processed between 180°-300° C. and exhibit a heat-distortion temperature above 140° C.

Another object of the present invention is to develop a series of poly(carbonate-imides) with resistance to common organic solvents such as acetone.

Another object of the present invention is to develop a series of poly(carbonate-imides) which exhibits a high degree of order or crystallinity after the system has been heated above its heat distortion temperature.

Another object of the present invention is a novel process for preparing a carbonate-containing polymer which does not involve the use of the hazardous chemical phosgene.

Another object of the present invention is the preparation of novel carbonate-containing monomers for use in the preparation of the poly(carbonate-imides).

Another object of the present invention is a novel process for preparing the polymeric precursors to the poly(carbonate-imides) in a solvent system.

Another object of the present invention is a novel process for thermally eliminating solvent and reaction by-products in preparing the poly(carbonate-imides).

SUMMARY OF THE INVENTION

According to the present invention, the foregoing and other objects are attained by incorporating a carbonate unit into a polyimide backbone at varying levels and of varying structures in order to produce a series of thermoplastic polymers with heat distortion temperatures in excess of 140° C., with solvent resistance, and with a high degree of order or crystallinity.

The present invention further encompasses a novel process for incorporating carbonate units into polyimide backbones without using phosgene.

The present invention also includes a novel series of dinitrodiphenylcarbonates and diaminodiphenylcarbonates.

BRIEF DESCRIPTION OF THE DRAWING

The drawing is a depiction of the polymerization reaction according to the invention.

DETAILED DESCRIPTION OF INVENTION

The present invention relates to a system of carbonates incorporated into polyimide backbones. The general structure of the poly(carbonate-imides) of this novel system is:

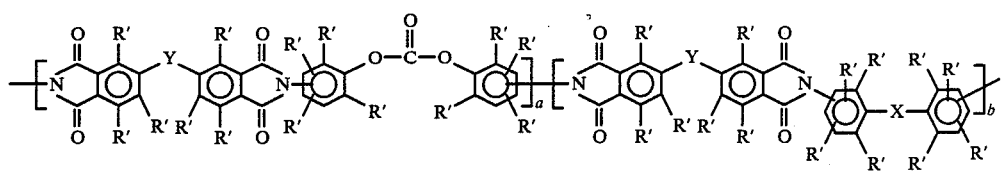

where the a:b ratio can vary between 10:0 to 1:9; X is nil or a divalent radical selected from

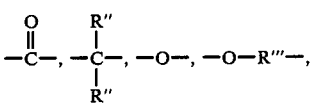

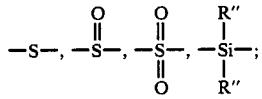

Y is nil or a divalent radical independently selected from

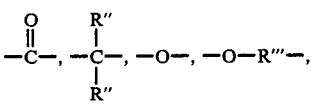

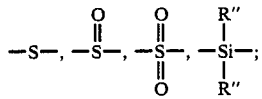

R' is a monovalent radical independently selected from hydrogen, alkyl, aryl, alkoxy, halogenated hydrocarbon, and N,N-dialkylamino;

R" is a monovalent radical independently selected from hydrogen, alkyl, aryl and halogenated hydrocarbon; and R'" is a divalent radical selected from alkylidene, arylidene, and divalent halogenated hydrocarbon radicals.

Two other embodiments of the poly(carbonate-imide) polymers are not covered by the foregoing general structure. If pyromellitic dianhydride is used in the reaction, the polymer will have the following general formula:

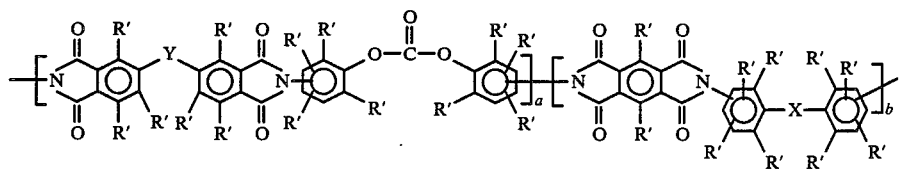

where the a:b ratio can vary from 10:0 to 1:9 and all other variables are as designated previously. This constitutes one of the alternate embodiments. The other possibility is to use phenylene diamine in the reaction to generate a polymer of the general formula:

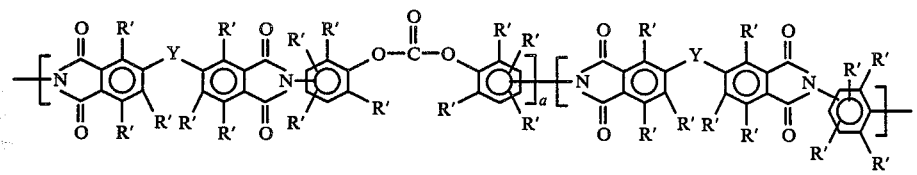

In addition, the phenylene diamine may also be used with dianhydrides other than pyromellitic dianhydride to produce the corresponding polymers.

The invention further relates to novel carbonate monomer compositions. The general structure of these carbonates is:

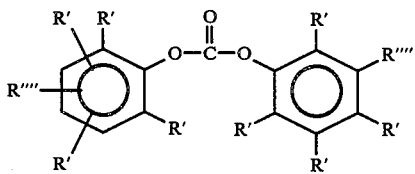

Where R'''' is selected from

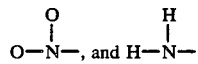

and R' is as described previously.

The invention further relates to a novel process for preparing poly(carbonate-imides) which does not employ phosgene. The poly(carbonate-imides) were prepared according to the reaction scheme shown in the drawing. Again, all of the substituents are as designated previously.

These diagrams specify that several appendages to the backbone structure are possible. Specifically alkyl, aryl, halogenated hydrocarbon radicals, and N,N-dialkylamino radicals. In all cases these radicals can have from one to twenty carbon atoms present in them. Moreoever, each radical is to be selected independently from any other radical present such that the radicals may appear in any combination thereof.

In certain situations, a group is shown that can be non-existent. For instance, the "X" and "Y" radicals may be nil in any possible embodiment of the invention. When this occurs, it shall be construed to mean that the "Y" radical is to be ignored and the two bonds connected to it shall be redrawn so as to directly connect with each other and form one bond.

The carbonate-containing monomers may be prepared in three very distinct forms. The 3,3' diaminodiphenylcarbonate, the 3,4' diaminodiphenylcarbonate, and the 4,4' diaminodiphenylcarbonate. Each of these forms may be substituted with all of the radicals previously mentioned as long as they are non-interfering substitutions in that they do not change or prevent the ensuing polymerization reaction. All of these three forms have varying physical properties which will manifest themselves in the final polymer such that it will also have distinct physical properties dependent upon the form of monomer used to prepare the polymer.

One version of the carbonate-containing monomers has been produced in the past using the phosgene process. See T. Fife and D. McMahon, J. Am. Chem. Soc., 91, 7481 (1969) and V. Lamm, O. Smirnova, and Y. Kolesnikov, Tr. Mosh Khim.-Tekhnol. Ins., 57, 102 (1968); CA 70, 96309 (1969). The 4,4' diaminodiphenylcarbonate was successfully synthesized due to the para relationship of the amino and carbonate attachments to the aromatic ring. This para relationship enhanced the stability of the molecule by sterically inhibiting the decomposition reaction of the amino and carbonate groups. Due to the high susceptibility of carbonate groups to amino groups, the 3,4' and 3,3' diaminodiphenylcarbonates were not successfully synthesized and were considered highly unstable.

The present invention has overcome this apparently misconceived notion of instability with respect to both the 3,3' and 3,4' diaminodiphenylcarbonates. It was discovered that the reaction between the amino and carbonate groups is somehow aided by the presence of water. Therefore, the present invention successfully prepared the 3,3' and 3,4' diaminodiphenylcarbonates by carrying out the reaction under anhydrous conditions. The 3,4 monomer can be prepared by the procedure of Example II. The 3,3' monomer was prepared by the procedure of Example X.

The process for making the poly(carbonate-imide) polymers from the carbonate-containing monomers involves three main ingredients and a solvent to serve as the reaction medium. These ingredients are a diaminodiphenylcarbonate, a dianhydride, and a dianiline. The diaminodiphenylcarbonate may be a 3,3'-; 3,4'-; or 4,4'-diaminodiphenylcarbonate with any number of non-interfering substituents attached to the hydrogen-substituted carbons of the phenyl groups. The dianhydride must be an aromatic dianhydride and may be, but is not limited to, pyromellitic dianhydride, oxydiphthalic dianhydride and hexafluoroisopropylidene dianhydride. Again, any and all of these dianhydrides may contain any number of non-interfering substituents on the aromatic rings. The dianiline must also be an aromatic dianiline and may be, but is not limited to, phenylene diamine, oxydianiline, and methylene dianiline. Again, any and all of these dianilines may contain any number of non-interfering substituents on the aromatic rings.

The initial reaction which forms the polymeric precursor is carried out in an organic solvent system. This solvent system may be comprised of dimethylacetamide (DMAc), N-methyl pyrrolidone, tetrahydrofuran, dioxane, diglyme, dimethylsulfoxide, ether based solvents, and any other amide type solvent system as well. DMAc is the preferred solvent for carrying out the present reaction.

The general process for making the poly(carbonate-imides) is shown in the drawing. To produce the homopolymer one would omit the dianiline from the initial reactants as in Example III. If the copolymer is to be produced, then one would include the dianiline among the initial reactants, as in Example VI. The ratio of the number of moles of diaminodiphenylcarbonate to the number of moles of dianiline will determine the ratio of b to a in the final product. Therefore, if a polymer containing 2 carbonate-imide units for every 8 imide units formed from the dianiline is desired, then one would react diaminodiphenylcarbonate with dianiline in the ratio of 2 moles to 8 moles respectively. The reaction should always be carried out with an excess of dianhydride.

Once the initial reactants have been mixed and allowed to react, it will be necessary to heat the solution to effect thermal cyclization of the intermediate diacids. The thermal cyclization step will require heating up to approximately 300° C. as shown in Example IX. The result of this step will be the solvent-free poly(carbonate-imides).

The reaction of the diaminodiphenylcarbonate monomers with dianhydride in DMAc yields a solution of high molecular weight polyamic acids. The molecular weights of the resultant polymers may vary from 10,000 to 100,000.

The inherent viscosities of the polyamic acid solutions were obtained at a concentration of 0.5 percent in DMAc at 30° C. Infrared spectra of the films were recorded on a Perkin-Elmer 137 spectrophotometer. Thermomechanical properties of the polymers were obtained by torsional braid analysis (TBA). Glass braids (10.2 cm) were coated with a 5 percent polymer solution and cured one hour each at 100°, 200°, and 300° C. in air before TBA.

Impact resistance was measured using a T. M. Long Co. ball impact tester. Samples were cut from the film and placed in a test slide in the tester. A spherical penetrator, one-half inch in diameter and weighing 8.35 g. was propelled by compressed air upwards through the sample by means of a foot treadle. The flight time of the ball was measured over a calibrated distance, yielding the velocity. As the ball passed through the sample, it lost velocity. Residual velocity was then measured in the same way. The kinetic energy of the ball before and after penetration was calculated, the difference being the energy absorbed by the sample.

Thermal properties of the polymers were investigated by means of a Du Pont Model 990 thermal analyzer/differential scanning calorimeter (DSC). Five layers of film were compressed in the sample pan to ensure conduction of heat. The polymer was heated to 450° to 475° C. at a program heating rate of 50° C. per minute and then rapidly cooled to room temperature using an ice bath.. The quenched sample was then heated up at the same rate of 450° C. to assess the effect of the first heat-up and rapid cool-down.

X-ray diffractograms of films were obtained using a wide angle X-ray diffractometer with a graphite monochromator and CuK radiation at 40 kV and 16 ma. Analysis was performed in reflectance mode at the low angles (5 to 30 degrees, $2\theta$) where polymeric materials characteristically diffract.

Polymers were synthesized according to the reaction scheme shown in the drawing. The values of a and b vary depending on molar ratios of the two diamines in the monomer feed. The resulting polymers have been given codes accordingly. For example, the homopolymers of 3,3' C., 3,4' C., and 4,4' C., where b=0, are given the code 3,3' C., 3,4' C ., and 4,4' C., respectively. The copolymer of 4,4' C., and 0 where a to b=1 to 9 is given to corresponding code $C_1 O_9$. Throughout the remainder of the text, polymers will be referred to by this code.

Reaction of the monomers in DMAc yield highly viscous solutions. Inherent viscosities varied in the range 0.59 to 0.65 dl/g., indicating the development of high molecular weight polyamic acids (Table 1).

Results of TBA are also summarized in Table 1. Increasing amounts of 4,4' C. in the copolymer lead to progressively lower glass transition temperatures (Tg). The —O—CO—O— units in the backbone probably increase flexibility of the relatively more rigid polyimide chain and hence enhance mobility on heating. The Tg's are at least 100° C. higher than those of known polycarbonates as is to be expected from incorporation of imide rings in the backbone.

The infrared spectrum of $C_4O_6$ and 0 films cured for 1 hr. at 100° C. and 4 hrs. at 200° C. shows peaks at 1780-1690 cm$^{-1}$ and 720 cm$-1$, typical of the imide grouping. The carbonate monomer shows strong absorption at 1781 cm$^{-1}$ and at 1221 cm$^{-1,}$ which may have been present in the carbonate-containing copolymers; absorption of the carbonate in the carbonyl region, however, appeared to be obscured by overlap with the strong imide doublet.

The hydrolytic instability of the carbonate linkage in the presence of aromatic amines is well known. The development of high molecular weight polymers as reflected by their inherent viscosities lead to the conclusion that the linkage is stable under these synthetic conditions.

Polymers O, $C_1O_9$, and $C_2O_8$ gave flexible, self-supporting films. Films of $C_4O_6$ tend to crack somewhat, whereas those of 3,3' C., 3,4' C., and 4,4' C. were brittle. The tendency of polycarbonates to form crazes leading to fracture is well known. An early microscopic study of commercial polycarbonate showed that virtually all stress crazes, formed by uniaxial tensile loading, contained craze matter consisting of oriented polymer aligned in the direction of applied tensile stress. O. K. Spurr, Jr. and W. D. Niegisch, *J. Appl. Polym. Sci.*, 6, 585 (1962). Fracture in one or more of the crazes results in brittle fracture of the polymer. In the present case, the carbonate grouping appears to have a related effect on properties of the copolymers. The fact that the phenomenon occurs only in films containing 40 or more mole percent of the carbonate diamine may substantiate this conclusion.

Results of impact testing are given in Table 2. It was not possible to test the homopolymers since the films were too brittle. Results show that increasing carbonate content in the copolymer results in decreasing impact strength. The nature of failure of the films yields a correlation. Whereas O, $C_1O_9$ and $C_2O_8$ gave irregular failures, $C_4O_6$ gave distinct star-shaped failures with lines of failure converging to a single point. The regular nature of failure may indicate that the curing process results in some degree of orientation in the film.

The carbonate-containing copolymers, $C_2O_8$ and $C_4O_6$ show considerable tendency to crystallize, going through repeated processes of melting (endotherm) and crystallization (exotherm) up to 450° C. In comparison, O and $C_1O_9$ (only 10 mole percent carbonate diamine) show no tendency to crystallize. The homopolymers 3,4' C. and 4,4' C. both show a marked tendency to crystallize. 3,3' shows an ordered Tg as reflected in partial recovery of the baseline at 190° C., but no crystallization. A similar observation was made by Morgan and O'Neal in the case of Lexan. R. J. Morgan and J. E. O'Neal, *J. Polym. Sci.. Polym. Phys. Ed.*, 14, 1053 (1976).

The Tg values observed as a change in baseline are given in Table 3. All of these samples were amorphous except 4,4' C. Tg values of the homopolymers varied in the following order:

3,3' C. 3,4' C. 4,4' C.

The unsymmetrical nature of the 3,3' and 3,4' isomers is probably the reason for this phenomenon. Similar results have been obtained in the case of polyimides of various diamines. V. L. Bell, B. L. Stump, and H. Gager, *J. Polym. Sci., Polym. Chem. Ed.*, 14, 2275 (1976), T. L. St. Clair, A. K. St. Clair, and E. N. Smith, "Structure-Solubility Relationships in Polymers," Frank W. Harris and R. B. Seymour, Eds., p. 199, Academic Press, New York (1977). Incorporation of increasing amounts of the carbonate in the copolymer lowers Tg as measured by DSC. The same trends were also observed in TBA data, as discussed previously.

In the case of 3,4' C. where the film was brittle, the diffraction specimen was smaller than the others. Films of 4,4' C. and 3,3' C. were not large enough to be analyzed. Study of the diffractograms in the 2 range of 15° to 25° suggest that a partial ranking of the polymers in terms of degree of crystallinity is possible. The curves for polymers 3,4' C. and $C_4O_6$ indicate more incipieht structure and thus more order than those for the other three materials. Diffraction peaks seem to be developing at 19° and 23° in the 3,4' C. specimen and at 19° in the $C_4O_6$ specimen.

These results agree with those from DSC studies. Flexible carbonate linkages in the backbone may allow chains to align more easily, leading to a relatively more ordered structure as reflected in stronger tendencies toward higher crystallinity.

A series of copoly(carbonate-imides) with varying amounts of the carbonate in the backbone has been synthesized and characterized. The effect of incorporation of a flexible linkage in the relatively rigid polyimide structure has been studied. The grouping was found to have a marked influence on impact resistance and thermal properties of the copolymer. Increasing amounts of carbonate led to a decrease in both impact energy and glass-transition temperature. Introduction of carbonate also affected the crystallinity of the copolymer. The copolymer containing 40 percent carbonate showed a distinctly higher tendency to crystallize than those with lower amounts, as shown by both the DSC and wide angle X-ray diffraction studies.

These novel polymers and copolymers are useful for any product or process which requires a polymer with a heat distortion temperature in excess of 140° C., with solvent resistance and a high degree of crystallinity. It is presently contemplated that a material from this series of polymers and copolymers will be used as a windscreen for supersonic aircraft. Certainly other useful commercial applications also exist for these materials.

TABLE 1

Chemistry and Properties of Copoly (carbonate-imides)

| Molar ratios[1] | | | | | Polymer Code | Inherent[2] Viscosity (dl/g) | $Tg^3$ (°C.) |
|---|---|---|---|---|---|---|---|
| 3,3'C | 3,4'C | 4,4'C | 0 | BTDA | | | |
| 0 | 0 | 0 | 1 | 1 | O | 0.59 | 319 |
| 0 | 0 | 1 | 9 | 10 | $C_1O_9$ | 0.65 | 297 |
| 0 | 0 | 2 | 8 | 10 | $C_2O_8$ | 0 62 | 287 |
| 0 | 0 | 4 | 6 | 10 | $C_4O_6$ | 0.65 | 278 |
| 0 | 0 | 1 | 0 | 1 | 4,4'C | 0.65 | 275 |
| 0 | 1 | 0 | 0 | 1 | 3,4'C | 0.62 | 248 |
| 1 | 0 | 0 | 0 | 1 | 3,3'C | 0.59 | — |

[1]Weight of monomers was adjusted to give a 20% 2/v solution in DMAc.
[2]Inherent viscosity of poly(amic acid) measured for a 0.5 percent solution in DMAc at 30° C.
[3]Glass-transition temperatures as obtained from TBA.

TABLE 2

Impact Testing of Copoly (carbonate-imide)

| Polymer Code | Impact Energy*, Kg-cm |
|---|---|
| 0 | 0.49 |
| $C_1O_9$ | 0.42 |
| $C_2O_8$ | 0.37 |
| $C_4O_6$ | 0.033 |

*Each value is the average of at least four data points.

TABLE 3

Glass-Transition Temperatures of Copoly (carbonate-imides)*

| Polymer Code | Tg (°C.) |
|---|---|
| 0 | 295 |
| $C_1O_9$ | 278 |
| $C_2O_8$ | 255 |
| $C_4O_6$ | 232 |
| 4,4'C | 210 |
| 3,4'C | 200 |
| 3,3'C | 190 |

EXPERIMENTAL DETAILS

Example I 4,4'-diaminodiphenylcarbonate was prepared by catalytic hydrogenation of the corresponding dinitro compound. Thus 24.2g 4-nitrophenol (0.174 mol) and 35.0g of 4-nitrophenyl chloroformate (0.174 mol) were reacted in the presence of 9.2g of sodium carbonate (0.087 mol). The reaction was carried out in a blender containing 25 ml methylene chloride and 100 ml of water. The crude product was obtained by interfacial reaction in three minutes. This material was recrystallized from acetone to give 30.1 g (60%) of long white needles, m.p. 131°–133.5° C. On further recrystallization from methylene chloride, m.p. was 141°–143.5° C. Literature reports m.p. 138–140° C. T. Fife and D. McMahon, *J. Am. Chem. Soc.*. 91, 7481 (1969). Catalytic hydrogenation of 1.95 g of this product with 0.18 g of 5% Pd on carbon in benzene gave 1.21 g 78%) of light tan crystals after one recrystallization from benzene, m.p. 147.5–149° C. Literature reports m.p. 140° C. with decomposition. V. Lamm, O. Smirnova, and Y. Kolesnikov, *Tr. Mosh. Khim.-Tekhnol Ins..* 57, 102 1968); CA 70, 96309 (1969). Elemental analysis showed C, 63.88; H, 5.01 compared to calculated values of 63.93 and 4.95% respectively.

Example II 3,4' dinitrodiphenyl carbonate was prepared by reacting 2.0 g of p-nitrophenylchloroformate (0.01 mol) with 1.39 g of m-nitrophenol (0. 01 mol). Removal of methylene chloride in vacuo and filtration yielded 2.56 g (85%) of a white solid, m.p. 117–119.5° C. Recrystallization from a 2:1 mixture of methylene chloride and petroleum ether in a freezer gave a product m.p. 118.5–121° C. Elemental analysis gave C, 51.24; H, 2.73 compared to calculated values of C, 51.33 and H, 2.65. 3 g of the compound were hydrogenated in 160 ml benzene with 0.3 g of 5% Pd on carbon in a Parr hydrogenator. After shaking 1.5 hours at room temperature, the catalyst was removed by filtration and the small amount of water formed was removed by drying with anhydrous MgSO$_4$. The volume of the solution was reduced to 50 ml under a water aspirator vacuum before petroleum ether was added. Crystallization afforded 1.55 g (64%) of 3,4'-diaminodiphenylcarbonate, m.p. 107–109.5° C. Elemental analysis showed C, 63.88, H, 5.00 and N, 11.47% compared to calculated values of 63.93, 4.95 and 11.47 respectively. IR of the KBr pellet showed absorptions at 3405, 3315 and 1610 cm$^{-1}$ due to amine and at 1758 and 1245 cm$^{-1}$ due to ester carbonyl. No nitro absorptions were present.

Example III

The polymerization of 4,4'-diaminophenylcarbonate (4,4'-DDC) with benzophenonetetracarboxylic dianhydride (BTDA) was carried out in dimethylaacetamide (DMAc) as the solvent. Thus, 0.1 mole of 4,4'-DDC was dissolved in 380 g of DMAc in a flask equipped with magnetic stirring. To this was added 0.1 mole of BTDA and the mixture was allowed to stir for one hour. The reaction medium became viscous which is indicative of polymer formation. The inherent viscosity of this solution was 0.65 when run at 0.5% solids at 30° C.

Example IV

The polymerization of 3,4'-diaminodiphenylcarbonate (3,4'-DDC) with BTDA was carried out in DMAc as the solvent. Thus, 0.05 mole of the 3,4'-DDC was dissolved in 190 g of DMAc with vigorous stirring. To this was added 0.05 mole of BTDA and the mixture was stirred one hour. The reaction medium became viscous and the inherent viscosity was 0.62.

Example V

The polymerization of 3,3'-diaminodiphenylcarbonate (3,3'-DDC) with BTDA was carried out in DMAc as the solvent. Thus, 0.05 mole of the 3,3'-DDC was dissolved in 190 g of DMAc and the solution was stirred. To this was added 0.05 mole of BTDA and stirring was continued for one hour. The reaction solution became viscous and the inherent viscosity was 0.59.

Example VI

The polymerization of 4,4'-DDC with BTDA and oxydianiline (ODA) was performed in DMAc. Thus, 0.001 mole of 4,4'-DDC and 0.009 mole of ODA were dissolved in 40 g of DMAc. To this was added 0.01 mole of BTDA and the reaction mixture was stirred for an additional hour. This solution became viscous and the inherent viscosity was 0.65.

Example VII

The polymerization of 4,4'-DDC with BTDA and ODA was performed in DMAc. Thus 0.002 mole of 4,4'-DDC and 0.008 mole of ODA were dissolved with stirring in 40 g of DMAc. To this was added 0.01 mole of BTDA and stirring was continued for one hour. This solution became viscous. The inherent viscosity was 0.62.

Example VIII

The polymerization of 4,4'-DDC with BTDA and ODA was prepared by dissolving 0.004 mole of 4,4'-DDC and 0.006 mole of ODA in 40 g of DMAc and adding 0.01 mole of BTDA. This mixture was stirred for one hour and had an inherent viscosity of 0.65.

Example IX

The polymers which are prepared in DMAc were cast into their films on plate glass and the DMAc was allowed to evaporate leaving the precursor poly(carbonate-amide acid). These films were thermally treated to temperatures up to 300° C. to yield the solvent free poly(carbonate-imides).

Example X 3,3'-Dinitrodiphenyl carbonate was prepared by a modified literature procedure. J. K. Brotherton and J. W. Lynn, U.S. Pat. No. 3,256,220 (1966). A slurry of 48.8 g of 3-nitrophenol (0.351 mol) in 200 ml benzene was stirred in a three-neck flask with a Tru-bore stirrer at ambient temperature. A solution of 29.5 g of phosgene (0.298 mol), an excess, in 160 ml methylene chloride at −40° C. containing 10 drops of triethylamine was added dropwise over a 30-minute period. Another solution of 25.6 g of sodium hydroxide (0.64 mol) in 100 ml of water was simultaneously added during the initial 10 minutes. The temperature of the reaction was maintained at 15° to 30° C. An orange oil initially formed. Overnight stirring at ambient temperature allowed conversion of this oil to fine, white crystals. Filtration, aqueous washing, and drying yielded 48.4 g (90.7 percent) of product, m.p. 166° to 169.5° C. One recrystallization from anhydrous acetone-methylene chloride gave a product, m.p. 168° to 171° C. Elemental analysis gave C, 51.39; H, 2.71 compared with calculated values of C, 51.33; H, 2.65 percent. IR spectra of a KBr pellet showed absorptions at 1781 and 1221 cm$^{-1}$ due to the carbonate group; those at 1508 and 1343 cm$^{-1}$ were due to the nitro group.

Catalytic hydrogenation of 6.0 g of 3,3'-dinitrodiphenyl carbonate with 0.20 g of 10 percent Pd on carbon in benzene gave 4.0 g (83 percent) of 3,3'-diaminodiphenyl carbonate, m.p. 135° to 137° C., after recrystallization from benzene. The elemental analysis showed C, 64.02; H, 4.90; N, 11.41 compared with calculated values of C, 63,93; H, 4.95; N, 11.47 percent. IR spectra of a KBr pellet gave an amine doublet centered at 3408 and N-H bending at 1622 cm$^{-1}$. The carbonate absorption was observed at 1742 and 1240 cm$^{-1}$. The nuclear magnetic resonance spectra (d$_6$-acetone) gave signals at 6.3 to 7.35 (8H, m, aromatic CH) and 4.7 δ (4-H, s, NH$_2$), which corresponded to the proposed structure.

We claim:

1. A poly(carbonate-imide) polymer comprising recurring units having the formula:

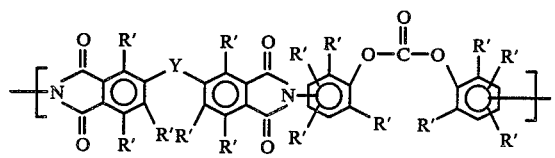

where

R' comprises a monovalent radical, having one to twenty carbon atoms, selected from hydrogen, alkyl, aryl, alkoxy, halogenated hydrocarbon, and N,N-dialkylamino;

Y is nil or a divalent radical selected from

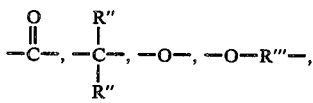

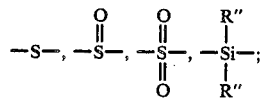

R" comprises a monovalent radical, having one to twenty carbon atoms, selected from hydrogen, alkyl, aryl and halogenated hydrocarbon; and R'" comprises a divalent radical selected from alkylidene, arylidene, and halogenated hydrocarbon.

2. A poly (carbonate-imide) polymer in accordance with claim 1 comprising recurring units, a, as in claim 1, of the formula:

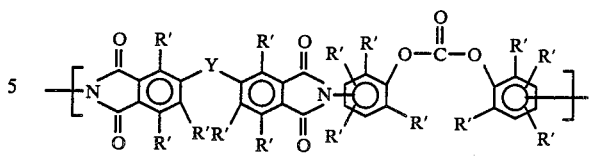

and recurring units, b, of the formula:

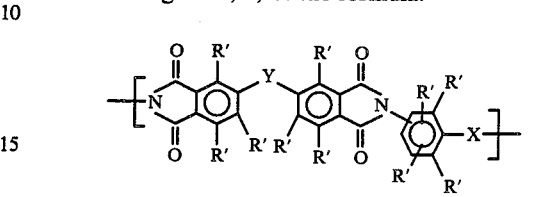

where X is nil or a divalent radical selected from

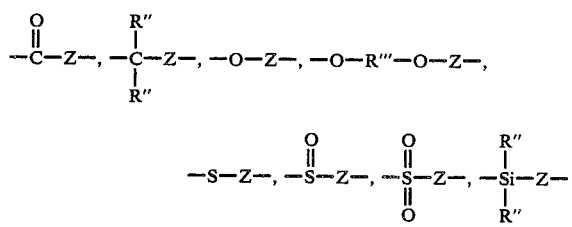

and Z comprises a divalent radical having the formula

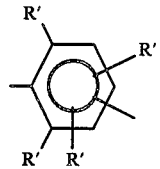

and where the ratio a:b an vary between 10.0 and 1-9.

3. The poly(carbonate-imide) polymer of claim 1 wherein the recurring unit comprises a carbonate-imide represented by the general formula:

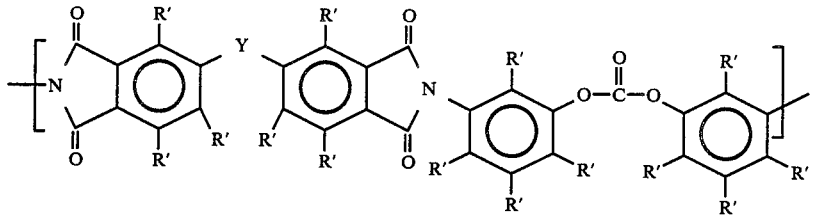

4. The poly(carbonate-imide) polymer of claim 1 wherein the recurring unit comprises a carbonate-imide represented by the general formula:

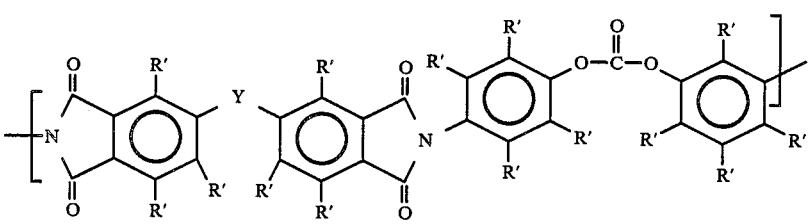

5. The poly(carbonate-imide) polymer of claim 1 wherein the recurring unit comprises a carbonate-imide represented by the general formula:

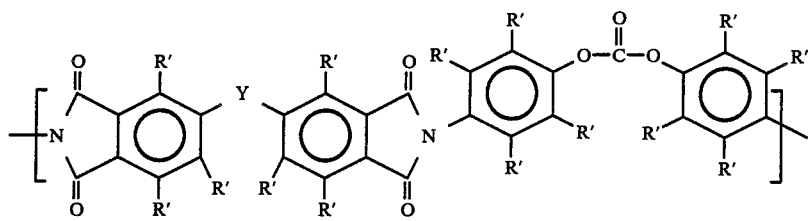

6. The poly(carbonate-imide) polymer of claim 2 wherein the recurring carbonate-imide unit comprises a carbonate-imide represented by the general formula:

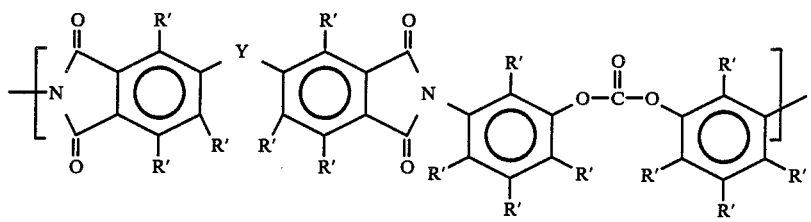

7. The poly(carbonate-imide) polymer of claim 2 wherein the recurring carbonate-imide unit comprises a carbonate-imide represented by the general formula:

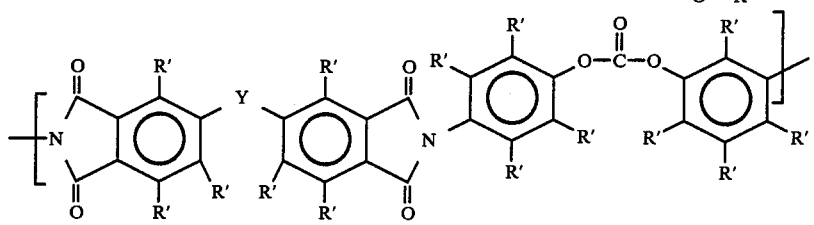

8. The poly(carbonate-imide) polymer of claim 2 wherein the recurring carbonate-imide unit comprises a carbonate-imide represented by the general formula:

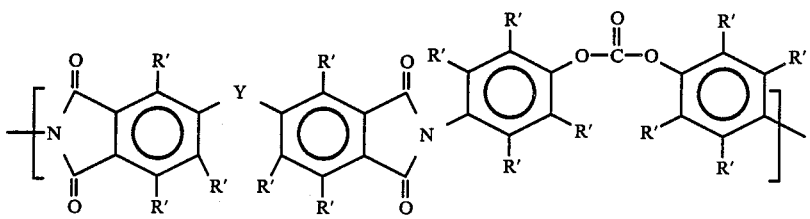

9. The poly (carbonate-imide) polymer of claim 2 wherein the recurring carbonate-imide unit comprises a carbonate-imide represented by the formula:

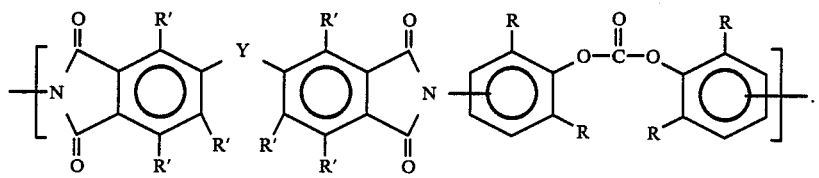

where R is a monovalent radical selected from methyl and isopropyl.

10. A process for preparing a poly (carbonate-imide) polymer containing the recurring units:

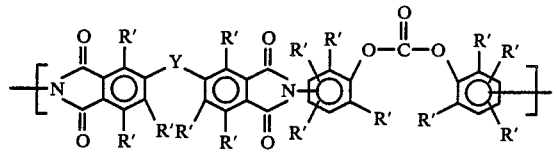

where
R' comprises a monovalent radical, having one to twenty carbon atoms, selected from hydrogen, alkyl, aryl, alkoxy, halogenated hydrocarbon, and N,N-dialkylamino;

Y is nil or a divalent radical selected from

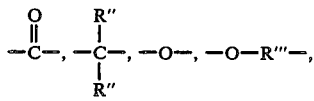

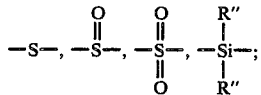

R" comprises a monovalent radical, having one to twenty carbon atoms, selected from hydrogen, alkyl, aryl, and halogenated hydrocarbon; and R''' comprises a divalent radical selected from alkylidene, arylidene, and halogenated hydrocarbon; comprising the steps of reacting an aromatic tetracarboxylic acid dianhydride having the formula:

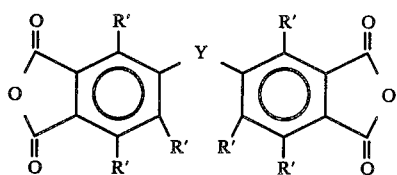

with a diaminodiphenylcarbonate having the formula:

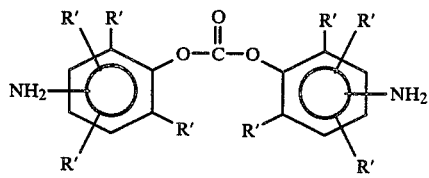

to form the poly(carbonate-amide acid) of the formula

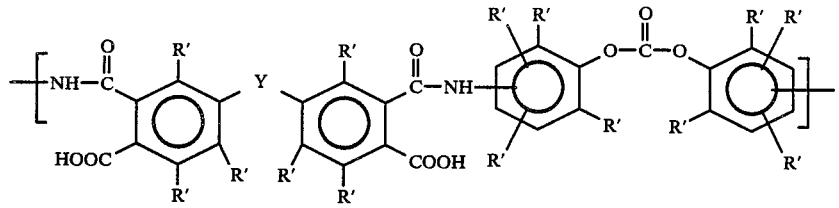

and then heating to effect cyclization of said diacid to produce said poly(carbonate-imide).

11. A process for preparing a poly(carbonate-imide) polymer in accordance with claim 10 containing recurring units, a, as in claim 11, of the formula:

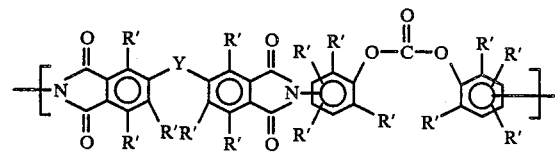

and recurring units, b, of the formula:

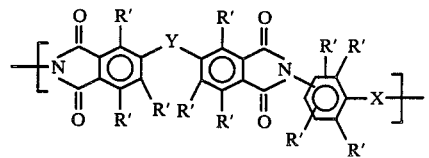

where X' comprises a monovalent radical selected from nil,

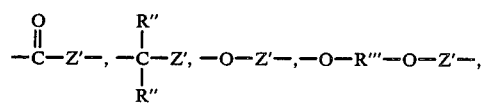

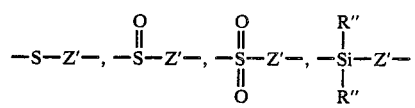

Z' comprises a monovalent radical having the formula:

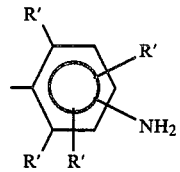

and where the ratio a:b can vary between 10:0 and 1–9; comprising the additional step of reacting a dianiline having the formula:

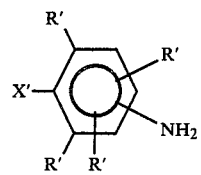

with said dianhydride and said diaminophenylcarbonate.

12. The process of claim 11 in which said dianiline comprises oxydianiline and said dianhydride comprises benzophenonetetracarboxylic dianhydride.

13. A diphenylcarbonate composition comprising diphenylcarbonates having the formula;

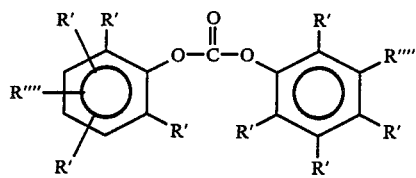
where R' comporiss a monovalent radical, having one to twenty carbon atoms, selected from hydrogen, alkyl, aryl, alkoxy, halogenated hydrocarbon, and N,N-dialkylamino; and R'''' comprises a monovalent radical selected from
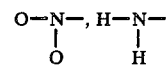
* * * * *